United States Patent
Balasubramaniyan et al.

(10) Patent No.: US 9,037,113 B2
(45) Date of Patent: May 19, 2015

(54) SYSTEMS AND METHODS FOR DETECTING CALL PROVENANCE FROM CALL AUDIO

(75) Inventors: Vijay Balasubramaniyan, Atlanta, GA (US); Mustaque Ahamad, Atlanta, GA (US); Patrick Gerard Traynor, Decatur, GA (US); Michael Thomas Hunter, Atlanta, GA (US); Aamir Poonawalla, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 36 days.

(21) Appl. No.: 13/807,837

(22) PCT Filed: Jun. 29, 2011

(86) PCT No.: PCT/US2011/042410
§ 371 (c)(1), (2), (4) Date: Dec. 31, 2012

(87) PCT Pub. No.: WO2012/006171
PCT Pub. Date: Jan. 12, 2012

(65) Prior Publication Data
US 2013/0109358 A1  May 2, 2013

Related U.S. Application Data

(60) Provisional application No. 61/359,586, filed on Jun. 29, 2010.

(51) Int. Cl.
*H04M 1/68* (2006.01)
*H04W 12/02* (2009.01)
*H04W 24/08* (2009.01)

(52) U.S. Cl.
CPC .............. *H04W 12/02* (2013.01); *H04W 24/08* (2013.01)

(58) Field of Classification Search
CPC ..... H04W 76/00; H04W 76/02; H04W 12/06; H04W 12/08; H04W 40/00; H04W 24/08; H04W 24/10
USPC ................ 455/403, 410, 411, 412.1, 450, 451
See application file for complete search history.

(56) References Cited

U.S. PATENT DOCUMENTS 6,256,606 B1   7/2001 Thyssen et al.
7,171,355 B1   1/2007 Chen
(Continued)

OTHER PUBLICATIONS

International Search Report and Written Opinion dated Jan. 13, 2012 for related PCT Patent Application No. PCT/US2011/042410.

*Primary Examiner* — Jean Gelin
(74) *Attorney, Agent, or Firm* — Troutman Sanders LLP; Ryan A. Schneider; Jay R. Anderson

(57) ABSTRACT

Various embodiments of the invention are detection systems and methods for detecting call provenance based on call audio. An exemplary embodiment of the detection system can comprise a characterization unit, a labeling unit, and an identification unit. The characterization unit can extract various characteristics of networks through which a call traversed, based on call audio. The labeling unit can be trained on prior call data and can identify one or more codecs used to encode the call, based on the call audio. The identification unit can utilize the characteristics of traversed networks and the identified codecs, and based on this information, the identification unit can provide a provenance fingerprint for the call. Based on the call provenance fingerprint, the detection system can identify, verify, or provide forensic information about a call audio source.

47 Claims, 9 Drawing Sheets

(56) References Cited

U.S. PATENT DOCUMENTS

| | | |
|---|---|---|
| 7,251,241 B1 | 7/2007 | Jagadeesan et al. |
| 7,925,304 B1* | 4/2011 | Gailloux et al. ............ 455/563 |
| 8,094,800 B1* | 1/2012 | Smith et al. ............ 379/210.02 |
| 2003/0054867 A1* | 3/2003 | Dowlat et al. ............ 455/567 |
| 2003/0112941 A1 | 6/2003 | Brown et al. |
| 2007/0025281 A1 | 2/2007 | McFarland et al. |
| 2007/0282613 A1 | 12/2007 | Diethorn |
| 2008/0291894 A1* | 11/2008 | Chang et al. ............ 370/352 |
| 2008/0300871 A1 | 12/2008 | Gilbert |
| 2009/0063159 A1 | 3/2009 | Crockett |
| 2009/0108854 A1* | 4/2009 | Agevik et al. ............ 324/691 |
| 2009/0119106 A1 | 5/2009 | Rajakumar et al. |
| 2009/0203365 A1* | 8/2009 | Lee et al. ............ 455/414.1 |
| 2009/0221276 A1* | 9/2009 | Vander Veen et al. ........ 455/418 |
| 2010/0105446 A1* | 4/2010 | Charlier et al. ............ 455/569.1 |
| 2011/0028168 A1* | 2/2011 | Champlin et al. ............ 455/466 |
| 2013/0097303 A1* | 4/2013 | Gichana et al. ............ 709/224 |
| 2014/0044020 A1* | 2/2014 | Mikkelsen et al. ............ 370/259 |

\* cited by examiner

SYSTEMS AND METHODS FOR DETECTING CALL PROVENANCE FROM CALL AUDIO

CROSS-REFERENCE TO RELATED APPLICATIONS

This application is a U.S. National Stage of International Application No. PCT/US2011/042410, filed 29 Jun. 2011, which claims the benefit of U.S. Provisional Application No. 61/359,586, filed 29 Jun. 2010, the entire contents and substance of which are hereby incorporated by reference as if fully set forth below.

TECHNICAL FIELD

Various embodiments of the invention relate to telecommunications call analysis and, more particularly, to systems and methods for detecting call provenance, which may be a source and path taken by a call, based on audio of the call.

BACKGROUND

Telephony networks are exceedingly complex systems. While once designed, manufactured, and run by a single company, today's telephone networks are an elaborate combination of many different technologies.

There are three general classes of telephony networks: public switched telephone networks (PSTNs), cellular networks, and voice over internet protocol (VoIP) networks. PSTNs are traditional, circuit-switched telephony systems. These networks are generally characterized by lossless connections and high fidelity audio. Components of the cores of some PSTNs are being replaced by internet protocol (IP) connections, but private links of PSTNs remain tightly controlled to ensure near-zero packet loss. Like PSTN systems, cellular networks have a circuit-switched core, with portions currently being replaced by IP links. While these networks can have considerably different technologies deployed in their wireless interfaces, the cores of cellular networks are extremely similar to PSTN networks. Lastly, VoIP networks run on top of IP links and generally share paths as other Internet-based traffic.

The current telephony infrastructure allows users to communicate using a variety of technologies. Circuit-switched landlines continue to provide telephony to the majority of homes and businesses. Mobile phones now offer service to more than four billion users over cellular networks. VoIP allows users to inexpensively communicate with each other irrespective of the geographical distances, using mobile phones and other computing devices. Each of these telecommunication networks adopts its own set of standards, including underlying transport protocols and codecs used, yet they seamlessly interact through a variety of conversion mechanisms. A call may traverse multiple types of networks, taking advantage of the benefits offered by each before reaching its final destination.

The diversification of telephony infrastructure significantly reduces the integrity associated with call metadata, such as caller identification, because metadata is either not transferred across these networks or is transferred without verification. As a result, metadata can be easily manipulated by hardware or software when passing between networks. For example, between Jan. 21 and 26 of 2010, customers of banks in four states received calls asking them to reveal personal information, including credit card and PIN details. Many of these attacks used VoIP phones to anonymously and inexpensively dial a large number of customers while forging the Caller-IDs of the applicable banks.

Similarly, fraudsters have used phishing emails that ask a bank's customers to dial *67 followed by a phone number that is claimed to belong to the bank but in reality belongs to a fraudster. After a customer follows these instructions, all further phone calls going to the customer phone are forwarded to the fraudster's number. Therefore anytime the bank attempts to call the customer, the call instead reaches the fraudster, which breaks many of the multi-factor authentication mechanisms currently employed by various banks.

SUMMARY

For various reasons, including the above, there is a need for detection systems and methods to detect all or part of the true provenance of a call. It is to such systems and methods that various embodiments of the invention are directed.

Various embodiments of the invention are systems and methods to detect call provenance based on call audio, thus not relying on metadata of a call. Briefly described, an exemplary embodiment of a detection system can comprise a characterization unit, a training unit, and a prediction unit.

The characterization unit can extract various characteristics of at least a portion of the audio of a call stream, where those characteristics may be a product of using a particular phone or of traversing particular networks. Such characteristics may therefore act as forensic information about the call stream. For example, and not limitation, the characterization unit can determine a noise profile for a call audio. The characterization unit can also detect packet loss and can identify a concealment algorithm used to regenerate lost packets. Information determined by the characterization unit may be indicative of one or more participating phones of a call or of various specific networks traversed by the call and can thus be used by the detection system to identify, verify, or provide forensic information about a participating phone or all or part of a route of the call.

For a particular call audio, the training unit can use features extracted by the characterization unit and can attach specific labels to the call based on prior knowledge about the call. On being provided with a set of training calls, along with the training calls' features and labels, the training unit can learn a first model for modeling an association between the features and the labels. In an exemplary embodiment the labels can be indications of one or more codecs used to encode the call audio. In an exemplary embodiment, the training unit can then use a multi-label classifier to model the association between the features and the multiple codecs. The model can be used to predict the codecs (i.e., labels) for a new call. The codecs in turn can be used to determine which types of networks were traversed by the call.

In some instances, the set of labels for a call can be a unique identifier for a particular phone. In such an instance, the training unit 120 can learn a second model that associates the features with this unique identifier. Thus, the detection system 100 can comprise or access a first model for mapping features to codecs and a second model for mapping features to call audio sources. If the audio being analyzed is of the calling party, the detection system 100 behaves as an alternative to traditional caller identification (also known as Caller-ID) or as a caller identification verification tool.

The prediction unit can use the features extracted by the characterization unit and the model learnt by the training unit to predict labels for new calls. The prediction unit can identify the codecs and the networks traversed by a new call, as well as uniquely identifying one or more participating phones. In addition, the characteristics of the call, such as the noise profile, the packet loss patterns, and the types of networks traversed, can be sufficiently different across different calls so as to create a unique provenance signature for a call. Accordingly, the prediction unit can identify the call audio source if the provenance signature has been previously encountered and corresponds to a known source, or the provenance signature can provide important information about the path of a call's audio, including for example, the source or the destination of the call audio.

These and other objects, features, and advantages of the detection system will become more apparent upon reading the following specification in conjunction with the accompanying drawing figures.

BRIEF DESCRIPTION OF THE FIGURES

FIG. 4A illustrates the amplitude of a two-second audio signal for a call over a VoIP network, while FIG. 4B illustrates the corresponding short-term average energy (STE) for the same audio signal.

DETAILED DESCRIPTION

Figure 1:
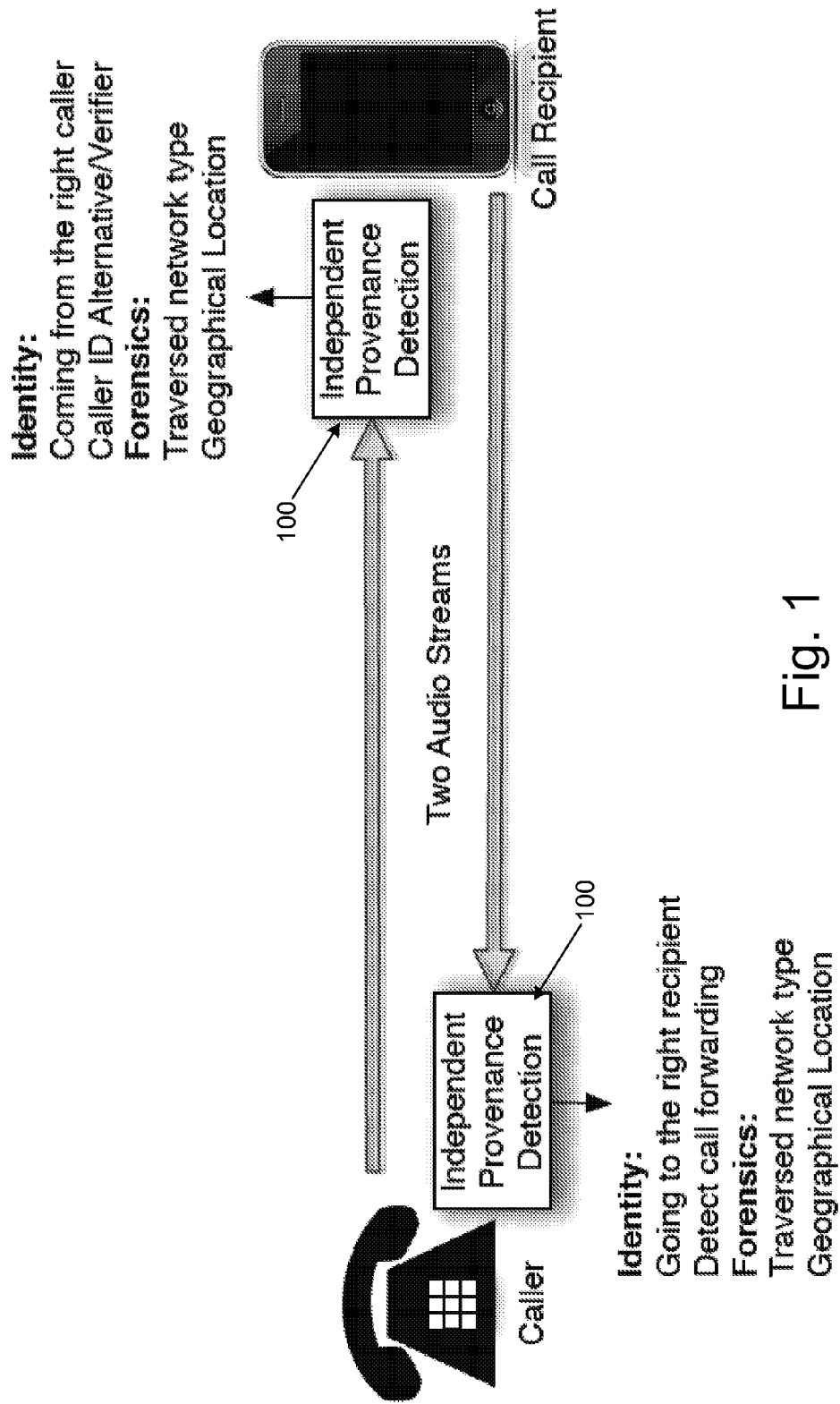
FIG. 1 illustrates a diagram of an exemplary telephone call and use of a detection system during or after the call, according to an exemplary embodiment of the present invention.

To facilitate an understanding of the principles and features of the invention, various illustrative embodiments are explained below. In particular, the invention is described in the context of being a detection system for determining call provenance based on audio analysis. Call provenance can be used to identify, verify, or provide forensic information about a source and path taken by a call audio. Embodiments of the invention, however, need not be limited to this context.

The components described hereinafter as making up various elements of the invention are intended to be illustrative and not restrictive. Many suitable components that can perform the same or similar functions as components described herein are intended to be embraced within the scope of the invention. Such other components not described herein can include, but are not limited to, similar or analogous components developed after development of the invention.

Various embodiments of the present invention are detection systems to determine call provenance based on audio analysis. Referring now to the figures, in which like reference numerals represent like parts throughout the views, various embodiment of the detection system will be described in detail.

FIG. 1 illustrates a diagram of an exemplary telephone call and use of a detection system 100 during or after the call, according to an exemplary embodiment of the present invention. As shown in FIG. 1, a call can be a two-way communication comprising at least two call audio streams, including a first call audio stream from the caller to the call recipient and a second call stream from the call recipient to the caller. The detection system 100 can analyze call audio from either call stream. When used to analyze call audio directed from the caller to the call recipient at the call recipient's end, the detection system 100 can behave as a caller identification device or as a caller identification verifier. When used to analyze call audio directed from the call recipient to the caller at the caller's end, the detection system 100 can determine if the call is being forwarded. Each call stream of a single call can have a different source and destination, depending on the direction of the call stream. Accordingly, the term "source," as used herein, can refer to the caller, to a telecommunications device of the call, to the call recipient, to a telecommunications device of the call recipient. Analogously, the term "path," as used herein, can refer to a path in either direction between (on one side) the caller or the caller's telecommunications device and (on the other side) the call recipient or the call recipient's telecommunications device.

Although FIG. 1 illustrates an embodiment of the detection system 100 being located at the end of each call stream of the call, this need not be the case. In an exemplary embodiment, an instance of the detection system 100 requires call audio from only a single one of the call streams in order to determine information about provenance related to that call stream. The detection system 100 can analyze a single one of the call streams, without a need to communicate additional information (i.e., other than the call audio) between the two sides of the two-way communication. In other words, the detection system 100 can be located at one end of a call, at both ends of the call, or may alternatively be located at a remote position, so as to analyze call audio during or after the call takes place.

In today's telephony networks, audio of a call stream may pass through multiple different types of networks, and metadata associated with the call audio may be modified between the networks, particularly at network gateways. In some cases, the only data related to a call that reliably passes between the networks is the call audio itself. The metadata cannot be trusted, as it is modifiable during transmission of the call audio. Accordingly, various embodiments of the present invention analyze the call audio to determine information about a path of the call audio, such as information about the source and the networks traversed. For example, and not limitation, a detection system of the present invention can determine or verify an identity of a call audio source, types of one or more networks traversed, a general geography of the call audio source, or even an identity of one or more specific networks traversed.

Figure 2:
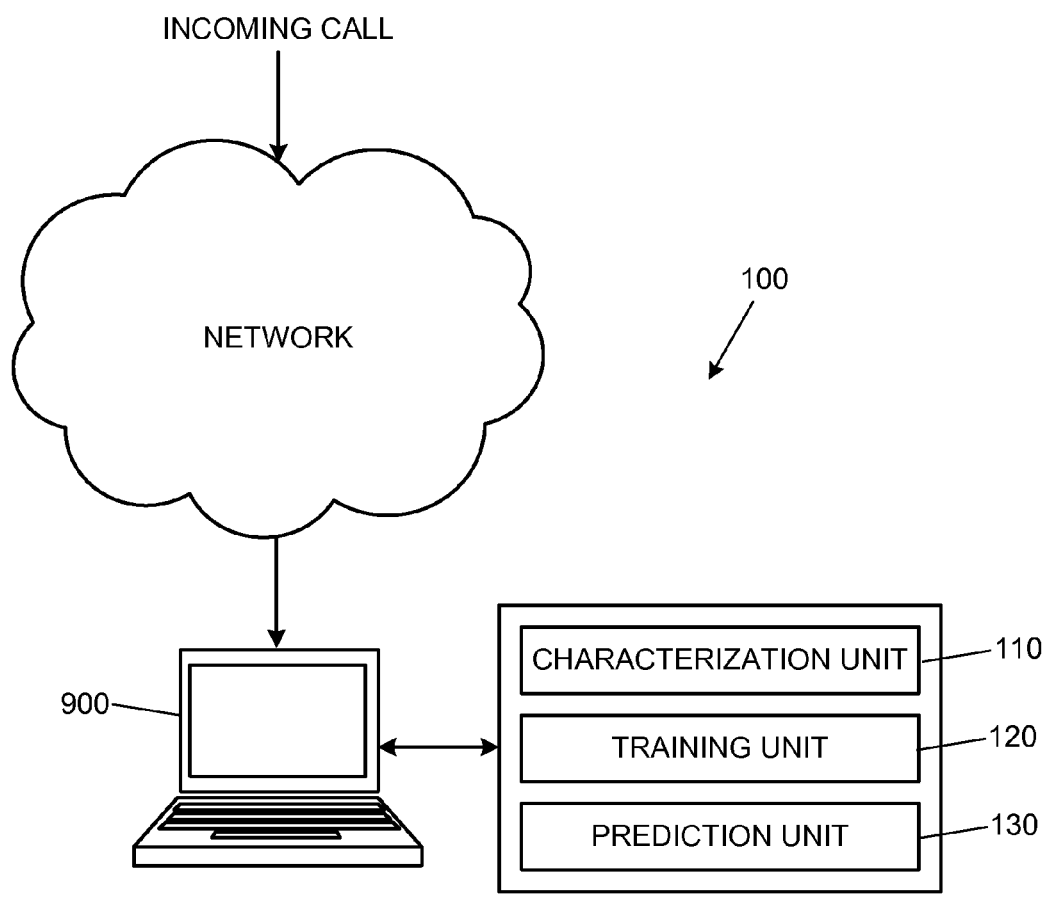
FIG. 2 illustrates a diagram of the detection system, according to an exemplary embodiment of the present invention.

FIG. 2 illustrates a diagram of a detection system 100, according to an exemplary embodiment of the present invention. As shown in FIG. 2, the detection system 100 can be embodied, in whole or in part, in a general or specialized computing device 900 (see FIG. 9), such as a personal computer or a caller identification or verification device. For example, and not limitation, one or more aspects of the invention can be a computer program product that is embodied in a computer readable medium and is executable by one or more processing units of one or more computing devices 900.

The detection system 100 can comprise one or more units for processing data to determine call provenance. The units of the detection system 100 can be programs, program modules, or other operative components of the detection system 100. These units can comprise, for example, a characterization unit 110, a training unit 120, and a prediction unit 130. Generally, the characterization unit 110 can extract various characteristics of networks through which a call stream traversed, based on call audio; the training unit 120 can be trained on prior call audio data and can learn one or more models to identify one or more codecs used to encode the call stream, or can learn to identify the geographical location of the source of the call stream, or can learn to identify the source of the call stream; the prediction unit 130 can use the features extracted by the characterization unit 110 and the model learnt by the training unit 120 to predict the codecs used to encode the call audio or to predict the geography of the source of the call stream or predict the source of the call stream. Although these units are described herein as being distinct components of the detection system 100, this need not be the case. The units are distinguished herein based on operative distinctiveness, but they can be implemented in various fashions. The elements or components making up the various units can overlap or be divided in a manner other than that described herein.

Figure 3:
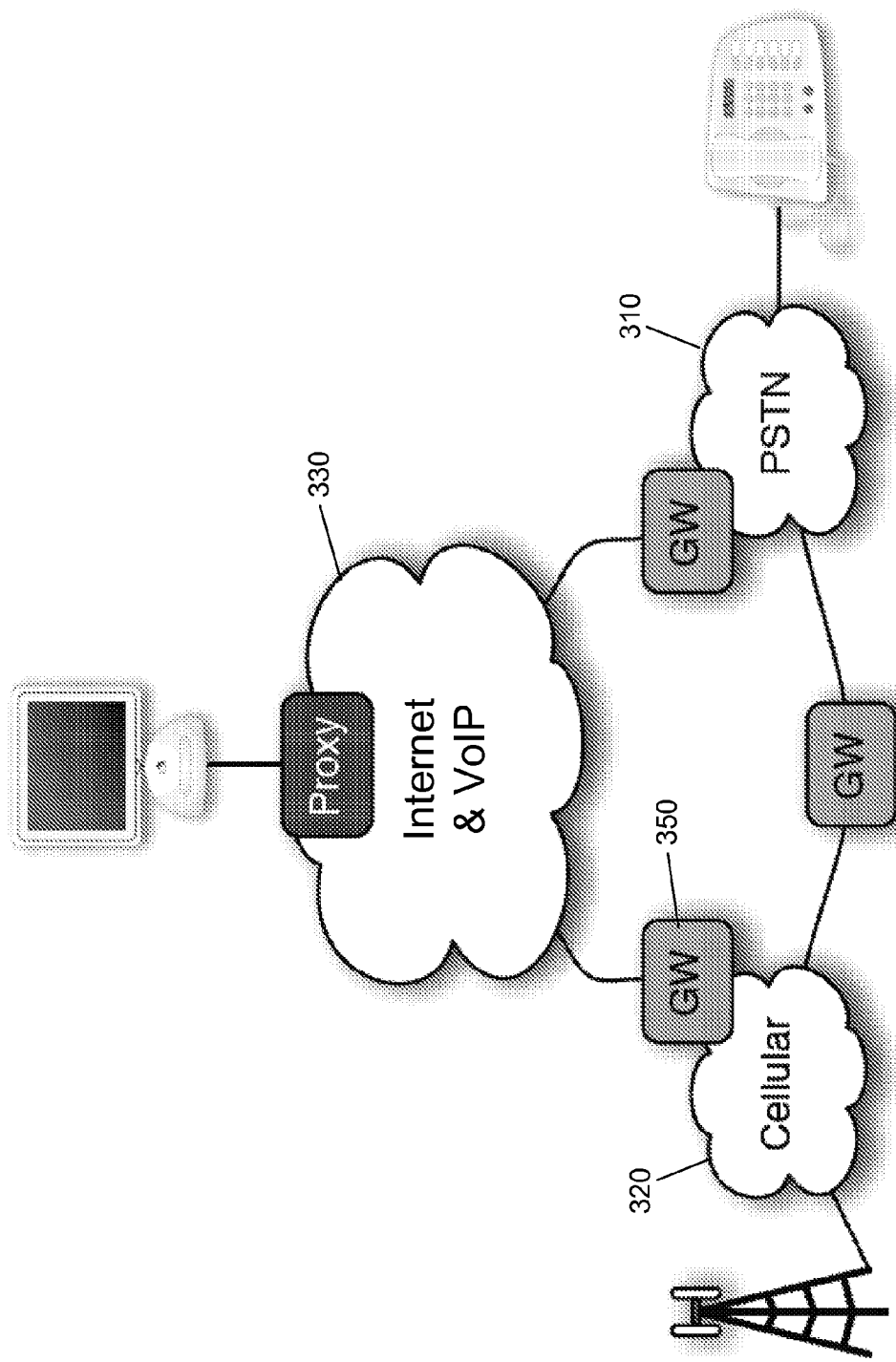
FIG. 3 illustrates a diagram of an exemplary combination of calling networks.

FIG. 3 illustrates a diagram of a combination of telephony networks, which represents the overall calling network used today. As shown in FIG. 3, there are three general classes of telephony networks: PSTNs 310, cellular networks 320, and VoIP networks 330. PSTNs 310 are generally characterized by lossless connections and high fidelity audio. Cellular networks 320 have circuit-switched cores that are similar across different cellular networks 310. VoIP networks 330 share paths with other Internet-based traffic and thus virtually always experience packet loss. Various embodiments of the detection system 100 can determine provenance of a call by analyzing an audio signal of the call to identify features that are characteristic of these three broad types of networks and, further, to identify features that are characteristic of a specific network under one of the broad networks, over which the audio signal was transmitted.

Generally, voice is encoded and decoded in each of these networks using a variety of codecs. Specific codecs may be selected for different networks based on competing goals, including sound quality, robustness to noise, and bandwidth requirements. While a large number of codecs exist, an exemplary embodiment of the detection system 100 can limit its analysis to a predetermined set of codecs. For example, and not limitation, an exemplary detection system 100 can consider the five commonly used narrowband codecs that are listed in Table 1, which appears below.

TABLE 1

| Networks | Codec | Applications |
|---|---|---|
| PSTN, VoIP | G.711 | Standard Telephony |
| Cellular | GSM-FR | Cellular Telephony |
| VoIP | iLBC | VoIP with Cable |
| VoIP | Speex | Xbox ® Live |
| VoIP | G.729 | SkypeOut, SkypeIn |

A codec commonly used in PSTNs 310 is G.711, with North America and Japan using the mu-law compression algorithm and Europe and other regions using A-law. Both the mu-law and A-law algorithms of this codec generate a 64 kbps (20 ms audio frames) constant bit-rate (CBR) stream for speech sampled at 8 kHz, which is relatively bandwidth intensive when compared to other codecs.

In cellular networks 310, the GSM full rate (GSM-FR) codec was the first digital cellular coding standard and is still widely used in cellular networks 310. Unlike G.711, which is a waveform coder, GSM-FR uses predictive coding, which is more common among modern codecs and allows a large reduction in bandwidth requirements. GSM-FR has an average bit rate of approximately 13 kbps.

Many codecs have been specifically designed for VoIP systems. The Internet low bit-rate codec (iLBC) is extremely robust to packet losses and operates on a bit rate of 13.33 kbps (30 ms audio frames) and 15.20 kbps (20 ms audio frames). iLBC is a mandatory standard for VoIP over cable and is also used by Google Voice™ and Skype®. Speex is a variable bit-rate (VBR) codec that supports a wide range of bit-rates, from 2.15 kbps to 44 kbps, and uses 20 ms audio frames. In addition to being supported on many VoIP soft phones, Speex is commonly used in gaming teleconferencing systems, such as Xbox Live. A large number of VoIP systems also use G.729 (10 ms audio frames), which requires very low bandwidth, as it supports a CBR of 8 kbps. Skype uses G.729 as well, when making and receiving calls to landlines and mobile phones with SkypeOut or SkypeIn service. G.729 is also used by most Cisco hard IP phones. A number of VoIP phones support G.711, which is used in PSTN 310 systems.

Because codecs may vary between two or more connected networks over which an audio signal is transmitted, audio may be re-encoded when passing between two different telephony networks. For instance, whereas the audio in a call between two PSTN users is likely to be encoded in only G.711, both G.711 and GSM-FR may be applied to the audio for a conversation between a user of a PSTN 310 and a user of a cellular network 320. Encoding changes may occur in media gateways 350 located at the edges of telephony networks, so VoIP calls may traverse multiple Internet autonomous systems without necessarily being re-encoded. Through this infrastructure, phone calls are delivered seamlessly between users. To establish call provenance, various embodiments of the detection system 100 can detect characteristics of underlying networks of a call and can thus determine a path or source of the call.

The provenance of a call describes the characteristics of the source, traversed networks, or both the source and traversed networks. For example, provenance can be used to identify whether a call passed through a VoIP network 330 and, if such a passing is unexpected based on the metadata, to alert the receiver of the change. Provenance, as detected by an exemplary embodiment of the detection system 100, can distinguish between traffic that has traversed different telephony networks: PSTN 310, cellular 320, and VoIP 330. The detection system 100 can detect provenance based only on audio content available at the receiving end of a call. This approach is attractive, because provenance may be thus determined without access or modification to intermediate network elements such as gateways or routers.

As a call traverses multiple networks, the audio of the call may be repeatedly re-encoded with the current network's corresponding codec. For example, a Skype call to a landline may be initially encoded using G.729 and re-encoded using G.711 when it encounters the VoIP-PSTN gateway 350. The detection system 100 can extract artifacts of each of the applied codecs from the received audio and can identify the codec based on the extracted artifacts. Based on the identified codecs, the types of networks over which the audio was transmitted can be identified. Identifying the codec used in a particular network helps characterize that network. But because some codecs, such as G.711, are widely used in both PSTN 310 and VoIP networks 330, codec detection alone may be insufficient to identify the types of networks used for a call. Accordingly, an exemplary embodiment of the detection system 100 can utilize other means of determining call provenance in addition to, or alternatively to, detecting codec artifacts.

As an exemplary artifact, the detection system may look at the degradations introduced by networks into call audio. For example, VoIP networks 330 introduce packet losses, which are not seen in circuit-switched PSTN 310. Cellular networks 320 may introduce bit errors due to fading effects on radio channels. The loss of an entire packet containing 20 ms of speech, as may occur in a VoIP network 330, is measurably different from a small number of incorrect bits, as may occur in a cellular network 320. Degradation is difficult, if not impossible, for a calling party to control. For example, and not limitation, an adversarial caller bounded by a lossy connection cannot spoof a lossless, dedicated PSTN line. Accordingly, the detection system 100 can detect whether degradation occurred and even the specific type of degradation that occurred, so as to identify the networks over which an audio signal was transmitted.

To identify and characterize the different networks a call traversed during a call, the detection system 100 can identify degradations specific to each network. A VoIP network 330 can be identified by detecting packet loss or concealed packet loss in the received audio. PSTN and cellular networks 310 and 320 can be identified and distinguished due to their different noise characteristics. Further, because the quality of the received audio significantly degrades with the number of networks traversed, the detection system 100 can also utilize quality-specific features to assist in determining call provenance.

The detection system 100 can create a feature vector that aggregates feature values obtained from packet loss, noise, and quality measurements. The feature vector is referred to herein as the provenance information, or a provenance fingerprint, of a call audio. In some instances, the provenance fingerprint can be unique to a particular source or entire path of the call audio. The feature vector can be used to train a machine learning classifier 810 (see FIG. 8) to identify the networks that a call traversed. The feature vector can also be used to train a classifier that can consistently identify and verify a call audio source.

To provide further details on how an exemplary embodiment can detect packet loss, it is noted that, within an IP network, a lost packet can be identified using the sequence numbers present in the metadata of each packet. These sequence numbers used in a first telephony network may be lost when the call is retransmitted over a second telephony network. The detection system 100 can identify artifacts of lost packets in the received audio.

Figure 4A:
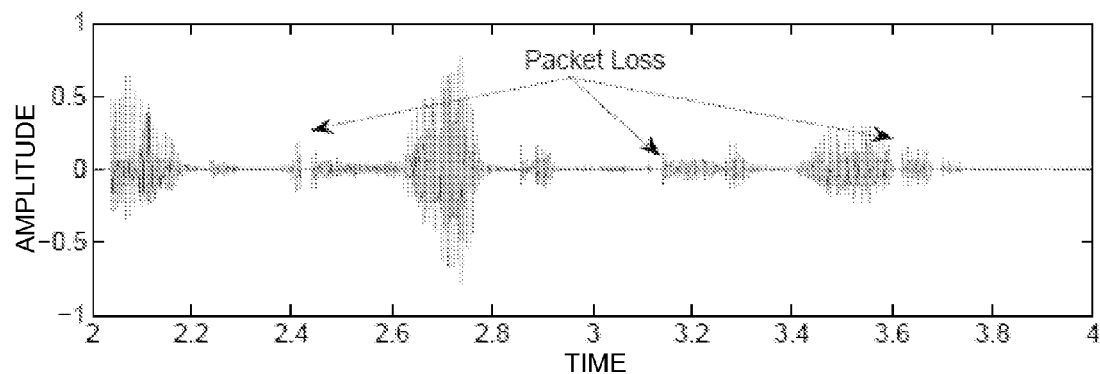
FIGS. 4A-4B illustrate graphs indicating exemplary packet loss in a VoIP network, with a packet loss rate of approximately 5%.
Figure 4B:
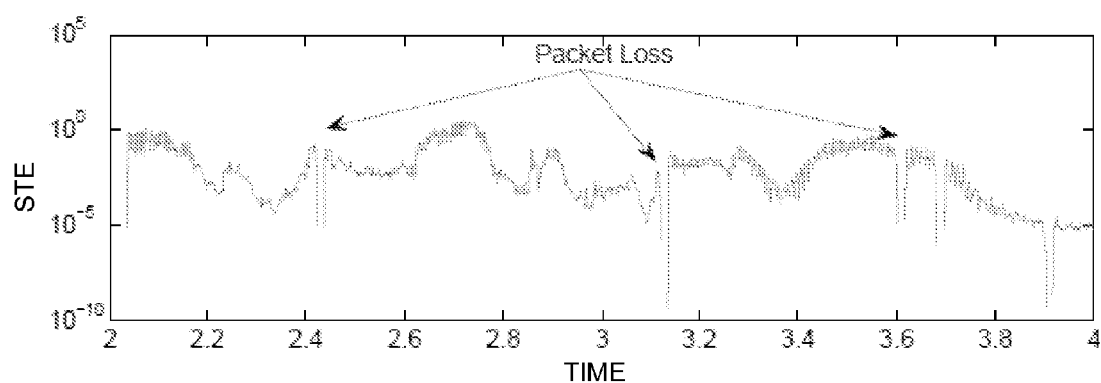

FIGS. 4A-4B illustrate graphs indicating exemplary packet loss in a VoIP network 330, with a packet loss rate of approximately 5%. FIG. 4A illustrates the amplitude of a two-second audio signal for a call over a VoIP network 330, while FIG. 4B illustrates the corresponding short-term average energy (STE) for the same audio signal. The detection system 100 can analyze the amplitude, the short-term energy, or both of these aspects when searching for an indication of packet loss. The effect of a lost packet is sometimes visibly identifiable by a break in the waveform. As shown, the packet loss can be more easily and more accurately detected when analyzing the short-term energy.

Packet loss results in abrupt breaks in audio, which may or may not be detectable by a human ear. These breaks in audio correspond to drops in energy, which are detectable when examining the STE. The STE for a received audio signal y(n) may be defined as:

$$E_n = \sum_{m=-\infty}^{\infty} y^2(m) * w(n-m)$$

Where $E_n$ is the STE for a window of speech w(n). Specifically, w(n) is a sliding Hamming window of length N, where the speech samples closer to n are weighted more heavily than those at the window's edge. For the codecs discussed herein, a packet may contain at least 10 ms of audio represented by 80 samples of speech. By making our window length less than 80, multiple values of $E_n$ may be completely influenced by a dropped packet. This may results in the breaks in energy shown in FIG. 4B. The detection system 100 can thus detect packet loss by looking for a significant drop in energy, which can be followed by an energy floor and accompanied by a significant energy rise.

The presence of all three of these characteristics (i.e., energy drop, energy floor, energy rise) may be necessary to detect packet loss, as each may appear individually in speech that has not experienced any packet loss. In FIG. 4B, a significant rise in energy at approximately the two-second mark may be due to the start of a speech segment. This may be a result of voice activity detection (VAD) in VoIP systems, whereby packets are only sent during active speech to reduce bandwidth. Analogously, when a speech segment ends, there may be a significant drop in energy.

Figure 5:
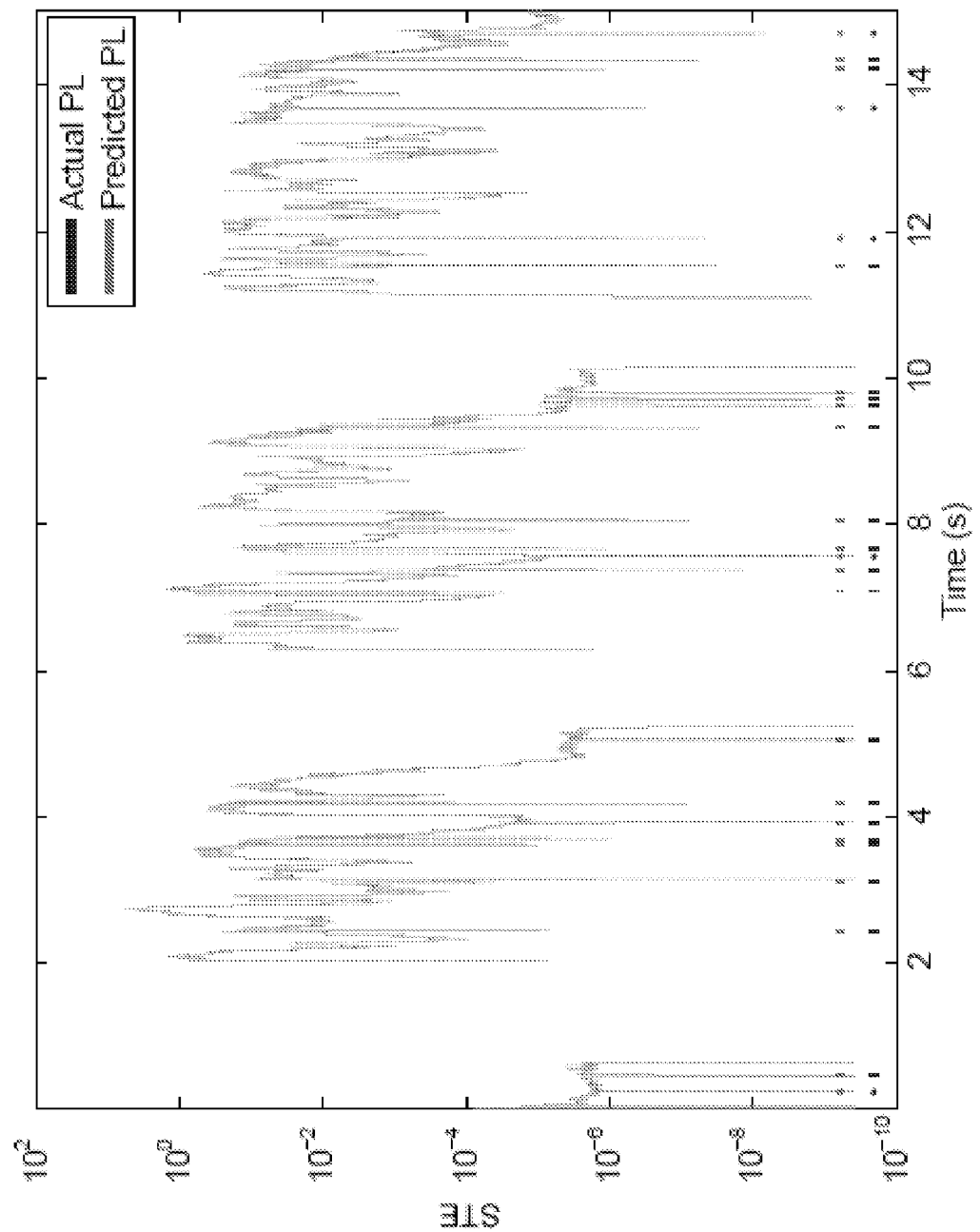
FIG. 5 illustrates exemplary analysis of the STE of a fifteen-second call audio signal, encoded with G.711 and transmitted through a network with 5% packet loss, where the STE analysis is in accordance with an exemplary embodiment of the present invention.

FIG. 5 illustrates exemplary analysis of the STE of a fifteen-second call audio signal, encoded with G.711 and transmitted through a network with 5% packet loss, according to an exemplary embodiment of the present invention. In FIG. 5, the lower row of dots toward the bottom of the graph represents the actual packet losses, and the upper row of dots represents the packet losses identified by the detection system 100. The close correspondence between the two sets of dots illustrates that the detection system 100 can accurately identify packet loss.

Figure 6A:
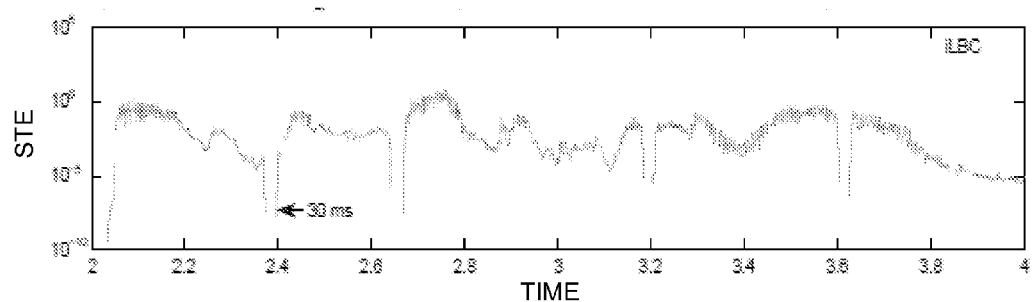
FIGS. 6A-6B illustrate exemplary packet loss of two VoIP networks that use different codecs. The VoIP network corresponding to FIG. 6A utilizes iLBC encoded at 30 ms of audio per packet, and the VoIP network corresponding to FIG. 6B utilizes Speex encoded at 20 ms of audio per packet.
Figure 6B:
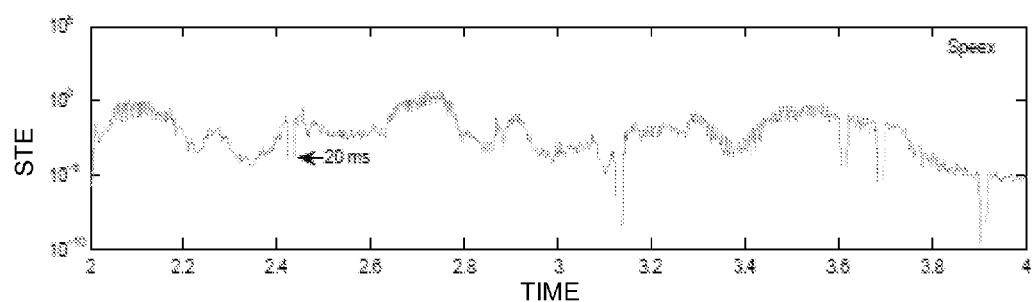

FIGS. 6A-6B illustrate exemplary packet loss of two VoIP networks 330 that use different codecs. The VoIP network 330 corresponding to FIG. 6A utilizes iLBC encoded at 30 ms of audio per packet, and the VoIP network 330 corresponding to FIG. 6B utilizes Speex encoded at 20 ms of audio per packet. Each time a packet loss is detected, the detection system 100 can also detect the length of the energy floor resulting from the packet loss. The detection system 100 can identify the specific codec used in a VoIP network 330 based on the length of the energy floor. As shown in FIGS. 6A-6B, for example, the length of the energy floor is generally larger for iLBC than for Speex. Analogously, because G.729 encodes 10 ms of audio per packet, while G.711 encodes 20 ms per packet by default, G.729 can be distinguished from G.711 based on the energy floor.

The dropping of multiple consecutive packets can result in a longer energy floor than would be expected of a codec. For example, two consecutive dropped packets can result in an energy floor twice as long as expected for a particular codec. Two consecutive packets dropped in a network using G.729 (10 ms audio) may show an energy floor similar to a single packet dropped in a network using G.711 (20 ms audio). However, the probability of consecutive packets being dropped is lower that the probability of a single dropped packet, and the detection system 100 can identify the codec used based on the most commonly occurring energy floor length.

Accordingly, STE can provide a highly accurate mechanism useable by the detection system 100 to determine packet losses and, thereby, to determine a codec used to encode an audio signal. When a call traverses a potentially lossy VoIP network 330, the detection system 100 can detect packet loss rate and the codec used in that VoIP network 330.

Some VoIP systems employ packet loss concealment (PLC) algorithms to prevent short speech gaps from affecting call quality. Such concealment can be carried out at the receiver (reactive) or with the assistance of the sender (proactive). In reactive recovery, a lost packet is concealed, with silence or with noise, or the lost packet is replaced by a new packet regenerated by interpolating previously received packets. Proactive recovery algorithms generally include redundant information, such as the previous packet's audio, with each packet, so as to enable recovery. Proactive recovery thus generally incurs a bandwidth overhead and is rarely used. Because of the rarity of proactive algorithms, the detection system 100 can limit its consideration of recovery algorithms to reactive algorithms.

When a VoIP network 330 uses a concealment mechanism, such as silence or noise substitution, the STE-based algorithm discussed above can be used by the detection system 100 to detect packet losses by suitably adjusting the energy floor to correspond to the noise floor. Most VoIP codecs, however, reconstruct lost packets from previous packets. For example, G.711 uses waveform substitution to repeat a portion of the previous packet. In codecs designed specifically for VoIP, such as iLBC and Speex, the concealment algorithm is generally more elaborate in order to improve robustness to high packet loss rates. The detection system 100 may be based on an assumption that concealment techniques are predominantly deterministic, and thus, the detection system 100 can utilize detection techniques that exploit the correlation between reconstructed packets and previous packets.

For clarity, further details of the PLC algorithm in iLBC are provided: iLBC uses a linear predictive coding (LPC) algorithm to represent speech in a significantly compressed form. LPC of iLBC is generally based on the source filter model of speech production, where the larynx (i.e., the source) produces sound energy, which, when voiced, consists of a fundamental frequency (i.e., pitch) and its harmonics. The sound energy is then shaped by the vocal tract (i.e., the throat and mouth) into enhanced frequency bands known as formants, which provide speech its intonation. The LPC algorithm inverse-filters the formants from the speech signal to leave behind the original sound energy, known as the residual. The iLBC codec uses the residual, the synthesis filters, and dynamic codebook encoding to reduce the original speech into a set of parameters that can be transmitted. An iLBC decoder uses these parameters to reconstruct the residual and the synthesis filters, which re-synthesize the speech when combined. When a packet is lost, the decoder uses the residual from the previous packet and creates a new pitch-synchronous residual for concealing the loss. Additionally, a random excitation is added to the new residual. The new residual and the synthesis filters from the previous packet are used to create speech that is be substituted for the lost packet. As a result, the new residual is strongly correlated with the previous packet's residual.

Given the above, to detect PLC in an audio signal, the detection system 100 can split the received audio into packets containing 30 ms audio each, which is the default for iLBC. The detection system 100 can then create a pitch-synchronous residual from each packet and compare each created residual to the residual extracted from the next packet. The detection of an association between sequential packets can indicate to the detection system 100 (1) that the audio signal is encoded with iLBC and (2) characteristics the specific LPC algorithm used.

Analogously, the detection system 100 can analyze correlations between packets to detect the use of other codecs, to detect the type of loss concealment algorithm used, and to detect lost packets and characteristics of packet loss. This detected information can be included in the detection system's profile for each call, which can be used to determine call provenance.

Accordingly, as discussed above, the detection system 100 can determine whether a call traversed a VoIP network 330, determine the packet loss rate of the VoIP network 330, and determine the codec used in the VoIP network 330. Regarding call provenance, the first of the determinations can indicate whether a VoIP network 330 is in the path of a call, and the second and third determinations can characterize the one or more VoIP networks 330 in the call path.

As discussed above, the detection system 100 can consider PSTNs 310, cellular networks 320, VoIP networks 330, or a combination of these network types. Accordingly, an exemplary embodiment of the detection system 100 can detect whether a call traversed one or more PSTNs 310 and one or more cellular networks 320, in addition to detecting VoIP networks 330.

Waveform codecs, such as G.711, are used mostly in PSTNs 310, as these codecs capture speech without any compression and require much higher bandwidth than most other codecs. Codecs used in PSTNs 310 tend to introduce noise only during speech activity, resulting in a strong correlation between the noise and the audio signal. This occurrence is known as "multiplicative noise," and its presence can be determined based on spectral statistic metrics: spectral level range and spectral level deviation. Furthermore, the spectral clarity for such a codec, or the measured crispness of the audio, is very high. In contrast, because cellular networks 320 require efficient use of bandwidth, cellular networks 320 generally use high compression codecs like GSM-FR. The spectral clarity of high-compression codecs used in cellular networks 320 suffers due to the significant compression. Spectral clarity quantifies the perceptible difference in call quality that is experienced when talking on a landline versus a mobile phone.

Figure 7:
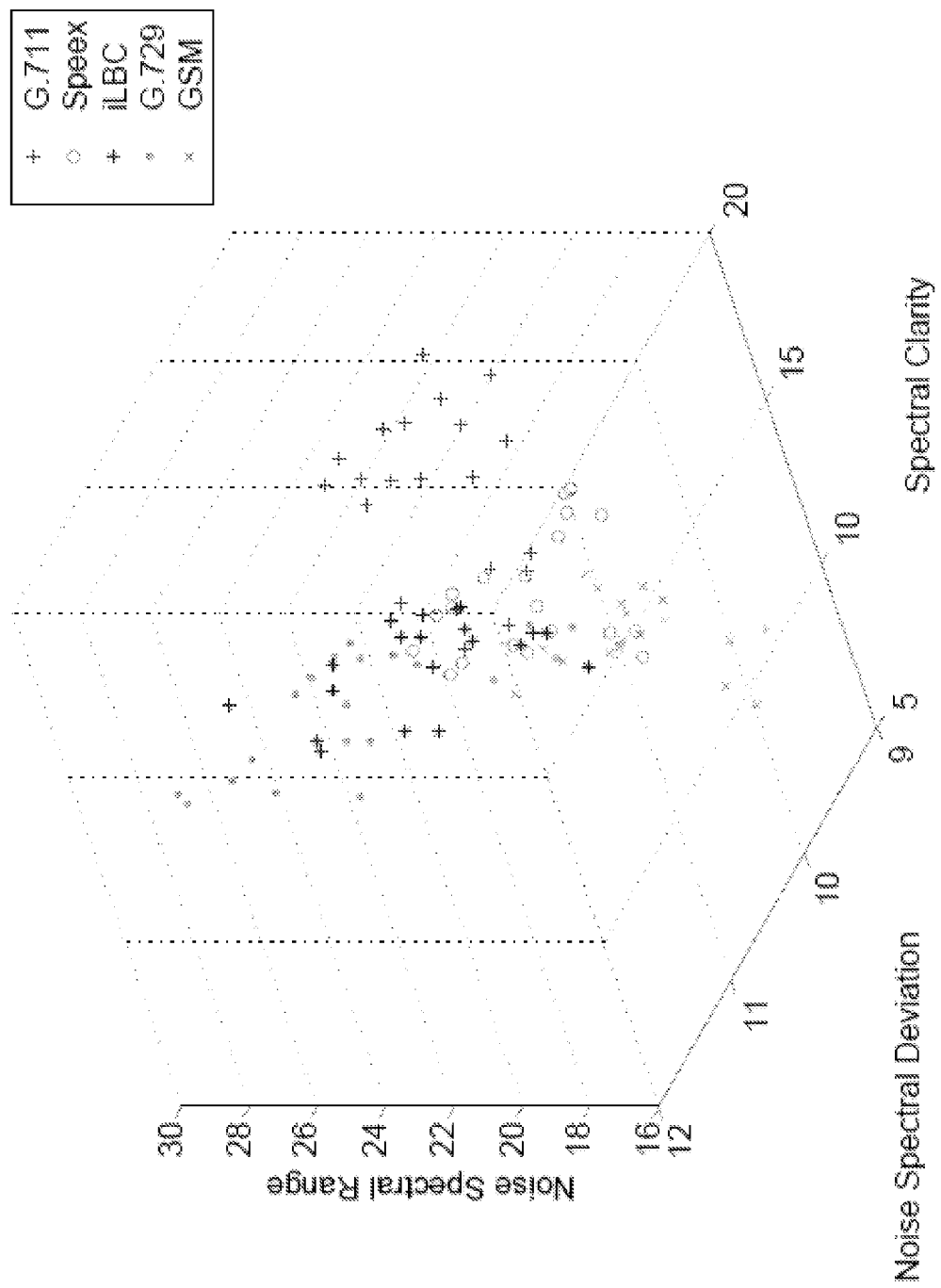
FIG. 7 illustrates the spectral clarity, the spectral level range, and deviation for 20 male and female American English speech samples from the Open Speech Repository, encoded and decoded using the five different codecs discussed herein.

FIG. 7 illustrates the spectral clarity, the spectral level range, and deviation for 20 male and female American English speech samples from the Open Speech Repository, encoded and decoded using the five different codecs discussed herein. As shown in FIG. 7, codecs G.711 and GSM-FR can be clearly differentiated and identified. Accordingly, the detection system 100 can identify the codec used based on the spectral clarity, the spectral level range, and the deviation of the received audio signal. After the codec is identified, the detection system 100 can do a codec-to-network translation to determine if a call traversed a PSTN 310 or a cellular network 320. The detection system can further utilize the spectral clarity, the spectral level range, and the deviation to provide a noise profile for a received audio signal. The noise profile can be further indicative of call provenance.

Call provenance can be used (1) to identify the path traversal signature (i.e., the set of networks traversed) and (2) to provide a detailed characterization of each network in the path traversal signature. The path traversal signature can identify the networks that a call traversed and the codec used, and the characterization can provide more details of each network. Various features determined by analyzing the call audio can be stored in a corresponding feature vector, which is also referred to herein as the fingerprint for the call stream. As the detection system 100 makes one or more of the various determinations discussed above, each determination can become a part of a call's provenance fingerprint, as each such determination is related to how the audio data was manipulated between the source of the audio stream and the destination.

Figure 8:
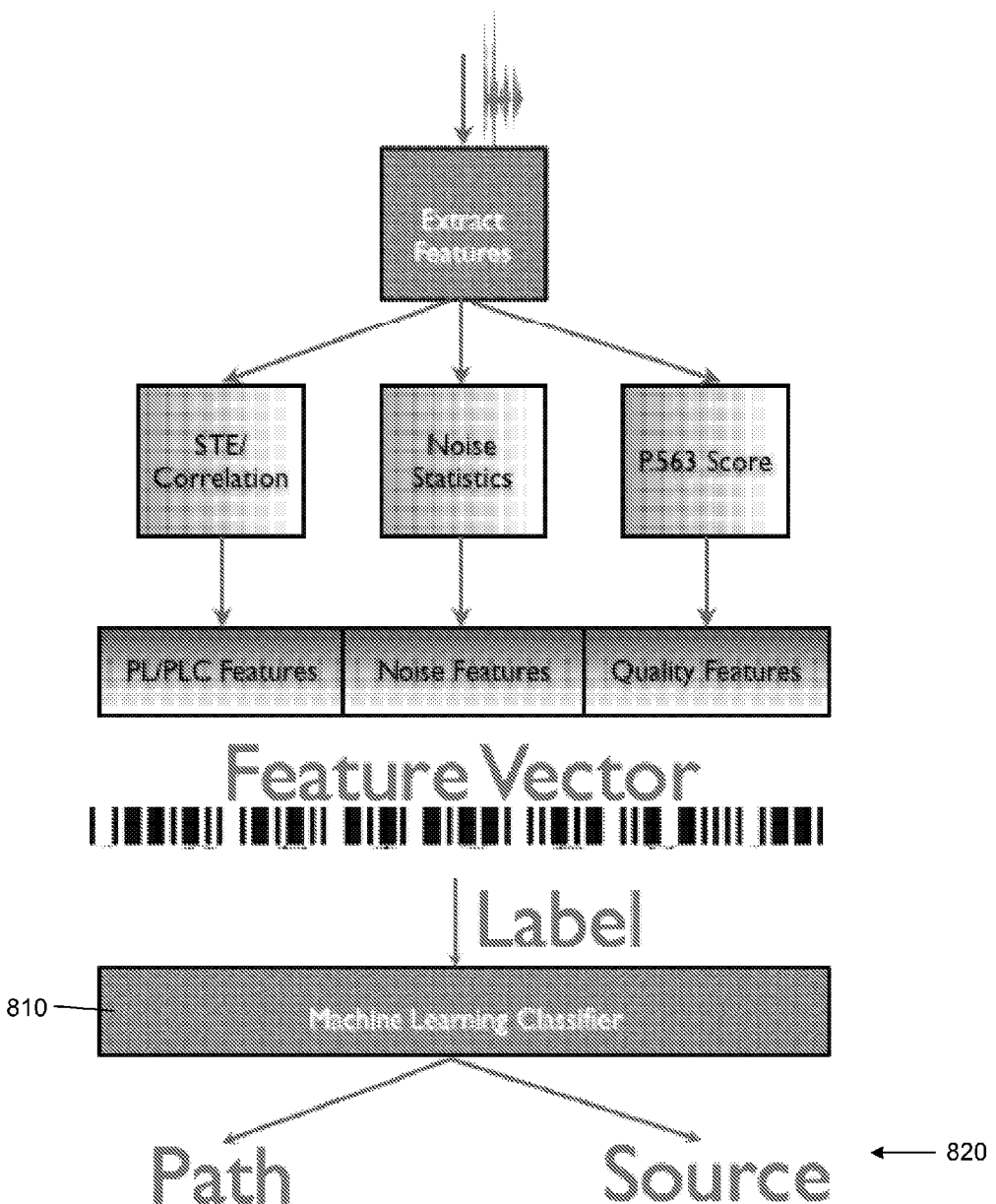
FIG. 8 illustrates how extracted features of an audio signal can be utilized to determine call provenance, according to an exemplary embodiment of the present invention.

FIG. 8 illustrates how extracted features of an audio signal can be utilized to determine call provenance, according to an exemplary embodiment of the present invention. To obtain the path traversal signature, the detection system 100 can train a machine learning classifier 810, as shown in FIG. 8, preferably using a repository of speech samples. Each audio sample may be subjected to codec transformations and network degradations, depending on the networks traversed. For each audio sample, packet losses can be identified. If any packet losses are identified, the detection system 100 can calculate the packet loss rate, which can then form at least a part of a packet loss profile and can be added to the corresponding feature vector, along with information extracted about codecs used. The detection system 100 can then apply a correlation algorithm (such as that discussed above, using iLBC as an example) to detect packet loss concealment. If the correlation algorithm finds concealed losses, the corresponding codec can again be added to the feature vector, along with the number of concealed packets (PLC profile). The detection system 100 can also extract a noise profile for the call audio and add the spectral metrics to the feature vector. Because the quality of speech degrades with the number of networks traversed, the detection system 100 can obtain call quality metrics from a single ended quality tool, such as P.563, and add this to the feature vector as well.

The machine learning classifier 810 can be one of many classifiers depending on the label being learnt. If the label being learnt is whether an audio sample contains the presence or absence of a codec, and if the number of codecs being considered is more than one, then the system can use a multi-label classifier. The multi-label classifier can be trained on each sample's feature vector and label, where the label identifies actual information about each call. For example, and not limitation, the detection system 100 can consider the five commonly used narrowband codecs described above. Each sample would then have five labels, each indicating the presence or absence of one of these codecs. For example, and not limitation, a call audio sample that was encoded using GSM-FR (originating at a cellular phone), re-encoded using iLBC (traversed a VoIP network 330), and then re-encoded using G.711 (received at a landline) can have a "1" for three labels, GSM-FR, iLBC, and G.711, and a "0" for the two other labels, Speex and G.729. The multi-label classifier can use a set of standard reduction techniques to convert the multi-label data into a single-label model. The classifier 810 can then learn which features best predict the presence or absence of a label.

For each newly received call audio, the prediction unit 130 can perform the same procedure or a similar procedure, without including a predetermined label. The machine learning classifier 810 of the detection system 100 can then predict a set of labels based on the learned model. In another exemplary embodiment the label being learnt can be a unique identifier for the phone producing the audio. In this case the machine learning classifier, 810 can use a single label classifier. The detection system 100 can then learn the identity of the source device for the call audio. The next time the same device makes a call, the device can be identified by the detection system 100.

The detection system 100 can provide various outputs, depending on the situation. For example, and not limitation, exemplary embodiments of the detection system 100 can output (1) an alert if the metadata of a call is contradicted by the provenance fingerprint 820, (2) a risk/confidence score depending on how similar the provenance predicted information is to metadata of a call, (3) an actual phone identity or telecommunications device identity, as identified by the detection system 100, or (4) other call source information. The metadata can include caller identification information, in which case the detection system 100 can acts as a caller identification verifier. After the detection system 100 has previously encountered call audio from a first caller, later calls from that first caller have a provenance fingerprint 820 matching the provenance fingerprint 820 of previous calls from the first caller. Accordingly, if a new call's metadata indicates that the source is first caller, but if the provenance fingerprint 820 of the new call does not sufficiently match the fingerprint 820 of previous calls from the first caller, then the detection system 100 can output an alert. Contrastingly, if the provenance fingerprint 820 of a new call matches the provenance fingerprint 820 of a previous set of one or more calls from a known first caller, then the detection system 100 can indicate that the new call comes from the first caller.

In one exemplary embodiment, a risk score for a particular call is calculated as a weighted and normalized sum of individual risk scores for each label for which the provenance predicted value is different from the claimed metadata value. The actual risk score is dependent on the label being predicted. For example, if values for a network traversed are predicted, and the prediction indicates that the call traversed a VoIP network while the metadata claims that it is a purely PSTN call, then such a difference could potentially be assigned a high risk value. The weight is based on how statistically confident the detection system 100 is of its prediction.

In some instances, the detection system 100 may not have encountered previous calls from a first caller. In this case, the detection system 100 can still provide forensic information, such as information about types of networks traveled by the call. For another example, a call between the UK and Massachusetts, United States, is expected to use the Hibernia Atlantic undersea telecommunication cable. If the training unit 120 is trained with a sample of calls that traverse this telecommunication cable, the training unit 120 can learn which features correlate with usage of this path. Thereafter, any new call that comes from the UK and uses this path can immediately be identified in that respect. Accordingly, the detection system 100 can differentiate between a call that originated within the United States from one that originated from outside the United States. As described earlier, the detection system 100 can also provide information on the type of network (VoIP, PSTN or cellular) a call traversed by training our training unit 120 with a sample of calls that have traversed one or more of these networks. As a result, when the detection system 100 cannot identify the call source precisely, useful information about the call source can still be provided and, in some instances, enough information may be provided to indicate that the metadata of a new call is inaccurate.

The path traversal signature and the complete provenance fingerprint 820 can provide a useful security framework in the absence of verifiable metadata. The traversal signature alone can be used against adversaries who are bound by operating constraints. For example, adversaries trying to spoof a dedicated line to the bank may use VoIP due to the fact that they can remain largely anonymous and can make a large number of inexpensive calls. However, the path traversal signatures for these two calls would differ significantly. To address this, the adversary can switch to a landline, in which case the adversary would lose the ability to easily make a large number of calls and would potentially compromise his or her anonymity. The provenance fingerprint 820 can also be used against adversaries, because the provenance fingerprint 820 can characterize individual networks. Accordingly, an adversary attempting to masquerade as a certain caller would have to replicate the various characteristics of the networks between the certain caller and the intended recipient.

Beneficially, various embodiments of the detection system 100 are not dependent on a voice or accent of either call participant. The various mechanisms discussed above for analyzing call audio are generally independent of call participant voices, including voiceprint, accent, speech patterns, pitch (i.e., frequency), volume (i.e., amplitude), and various other voice factors. Accordingly, if a call participant attempts to disguise his or her voice, an exemplary embodiment of the detection system 100 can still succeed in properly determining and matching a provenance fingerprint.

Various services and hardware products can be provided integrating or otherwise utilizing various embodiments of this invention. For example, a bank or other entity may analyze a set of recorded past calls, creating provenance fingerprints for individual clients. When a bank client tries to activate a credit card, requests a transfer, or performs various other financial transactions over the phone, the bank can use the detection system 100 to verify that the call originated from a legitimate client, before processing the transaction. The call might also be recorded, in which case the detection system 100 can analyze the recorded call to determine if it came from an appropriate customer. Some embodiments of the detection system 100 can also provide fraud prevention information, such as identifying that a call traversed over a VoIP network. Fraud prevention information can be used in conjunction with other available information, such as the client's registered phone or other device being a landline, to result in alerts as needed. Banks also call a customer as one factor in a multifactor authentication system. In this case the bank can use the detection system 100 to determine if the call has been forwarded to a different telecommunications device as the resulting fingerprint will change.

Some embodiments of the detection system 100 can be used as, integrated into, or otherwise in communication with, a caller identification device or a caller identification verifier. The detection system 100 can analyze each incoming call and provide true caller identification information, based on a call provenance fingerprint 820, or provide an alert when the metadata of a call is contradicted by its call provenance fingerprint 820.

An exemplary embodiment of the detection system 100 can be used to create or enforce an exclusion list, such as a blacklist or a whitelist, for one or more call recipients, by populating one or more of exclusion lists with provenance fingerprints of recognized entities previously encountered by the detection system 100. For example, if a first call participant desires to receive calls only from a particular group of potential other call participants, the detection system 100 can verify that the call audio for a newly connected call matches, or is otherwise consistent with, a provenance fingerprint 820 of a call participant on a whitelist for the first call participant. The detection system 100 can automatically provide a notification when a connected call fails to match a call participant on the whitelist. Such notification can comprise, for example, automatically rejecting the call or automatically providing an alert to the first call participant. In contrast, a blacklist comprises a set of provenance fingerprints 820 for others with whom the call participant does not wish to communicate. The detection system 100 can automatically provide a notification when a connected call matches a call participant on the blacklist Such notification can comprise, for example, automatically rejecting the call or automatically providing an alert to the first call participant. Further, when the first call participant participates in a call from a not-yet blacklisted or whitelisted second call participant, the detection system 100 can add the second call participant to a blacklist or whitelist at the first call participant's request, by detecting and recording the provenance fingerprint 820 of the other party to the call. A further benefit of the detection system 100 is that the detections system 100 can provide notifications regardless of whether the first call participant using the detections system 100 is the caller or the call recipient. Accordingly, for example, if the first call participant places a call to a blacklisted individual, the detection system 100 can alert the call participant of the blacklist violation.

The detection system can also be used to create a fraud database, which can also be used as an exclusion list. When it is determined that a particular call has a fraudster as a call participant, then the provenance fingerprint 820 of the call stream originating at the fraudster can be recorded in the fraud database. The fraud database can be used as a blacklist by individuals, banks, or other entities to exclude calls from known fraudsters.

Figure 9:
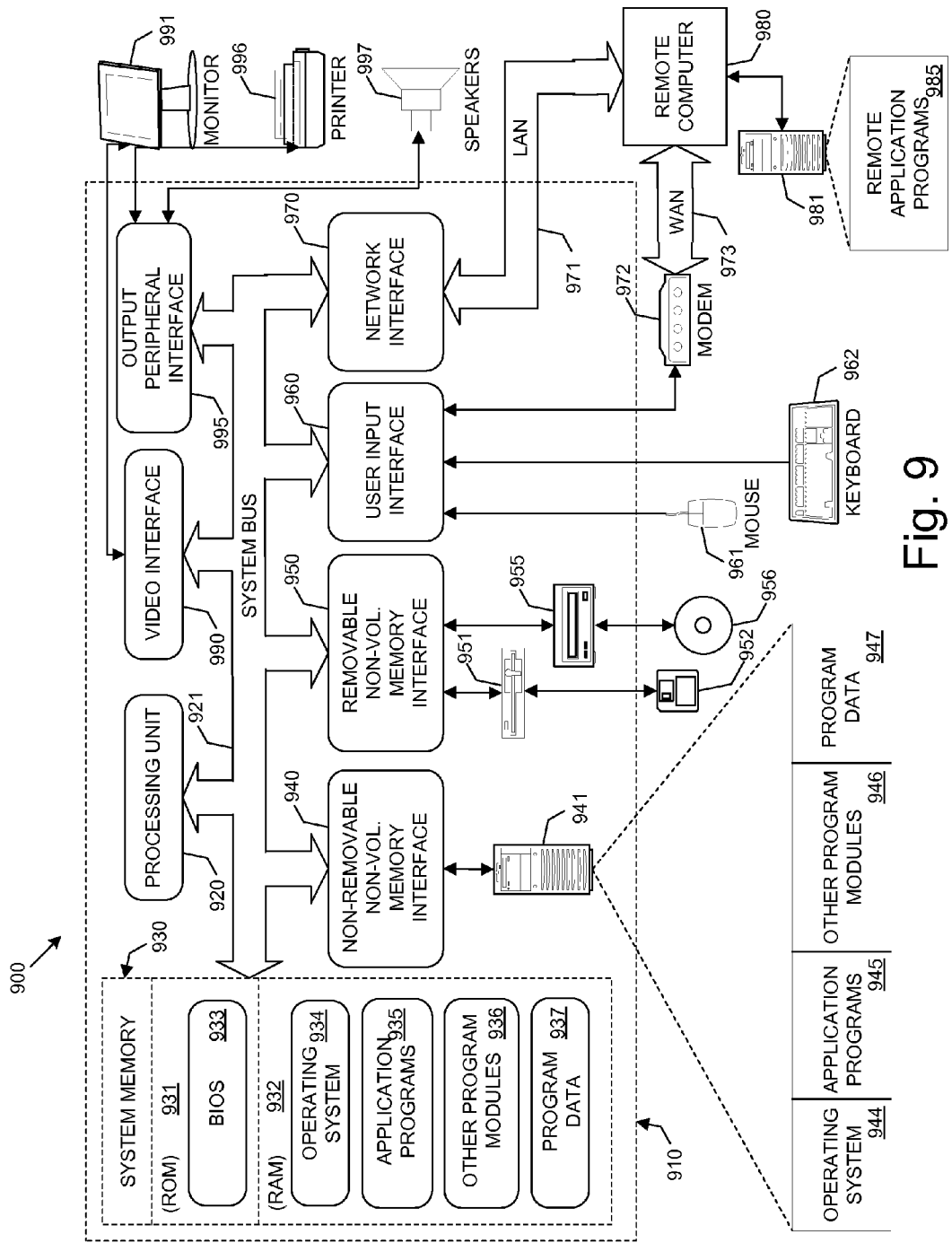
FIG. 9 illustrates an example of a suitable computing device that can be used as or can comprise a portion of the detection system, according to an exemplary embodiment of the present invention.

As mentioned above, one or more aspects of the detection system 100 and related methods can be embodied, in whole or in part, in a computing device 900. FIG. 9 illustrates an example of a suitable computing device 900 that can be used as or can comprise a portion of the detection system 100, according to an exemplary embodiment of the present invention.

Although specific components of a computing device 900 are illustrated in FIG. 9, the depiction of these components in lieu of others does not limit the scope of the invention. Rather, various types of computing devices 900 can be used to implement embodiments of the detection system 100. Exemplary embodiments of the detection system 100 can be operational with numerous other general purpose or special purpose computing system environments or configurations. Examples of well-known computing systems, environments, and/or configurations that can be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Exemplary embodiments of the detection system 100 can be described in a general context of computer-executable instructions, such as one or more applications or program modules, stored on a computer-readable medium and executed by a computer processing unit. Generally, program modules can include routines, programs, objects, components, or data structures that perform particular tasks or implement particular abstract data types. Embodiments of the detection system 100 can also be practiced in distributed computing environments, where tasks are performed by remote processing devices that are linked through a communications network.

With reference to FIG. 9, components of the computing device 900 can comprise, without limitation, a processing unit 920 and a system memory 930. A system bus 921 can couple various system components including the system memory 930 to the processing unit 920. The system bus 921 can be any of several types of bus structures including a memory bus or memory controller, a peripheral bus, and a local bus using any of a variety of bus architectures. By way of example, and not limitation, such architectures can include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 900 can include a variety of computer readable media. Computer-readable media can be any available media that can be accessed by the computing device 900, including both volatile and nonvolatile, removable and non-removable media. For example, and not limitation, computer-readable media can comprise computer storage media and communication media. Computer storage media can include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store data accessible by the computing device 900. For example, and not limitation, communication media can include wired media such as a wired network or direct-wired connection, and wireless media such as acoustic, RF, infrared and other wireless media. Combinations of any of the above can also be included within the scope of computer readable media.

The system memory 930 can comprise computer storage media in the form of volatile or nonvolatile memory such as read only memory (ROM) 931 and random access memory (RAM) 932. A basic input/output system 933 (BIOS), containing the basic routines that help to transfer information between elements within the computing device 900, such as during start-up, can typically be stored in the ROM 931. The RAM 932 typically contains data and/or program modules that are immediately accessible to and/or presently in operation by the processing unit 920. For example, and not limitation, FIG. 9 illustrates operating system 934, application programs 935, other program modules 936, and program data 937.

The computing device 900 can also include other removable or non-removable, volatile or nonvolatile computer storage media. By way of example only, FIG. 9 illustrates a hard disk drive 941 that can read from or write to non-removable, nonvolatile magnetic media, a magnetic disk drive 951 for reading or writing to a nonvolatile magnetic disk 952, and an optical disk drive 955 for reading or writing to a nonvolatile optical disk 956, such as a CD ROM or other optical media. Other computer storage media that can be used in the exemplary operating environment can include magnetic tape cassettes, flash memory cards, digital versatile disks, digital video tape, solid state RAM, solid state ROM, and the like. The hard disk drive 941 can be connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9 can provide storage of computer readable instructions, data structures, program modules and other data for the computing device 900. For example, hard disk drive 941 is illustrated as storing an operating system 944, application programs 945, other program modules 946, and program data 947. These components can either be the same as or different from operating system 934, application programs 935, other program modules 936, and program data 937.

A web browser application program 935, or web client, can be stored on the hard disk drive 941 or other storage media. The web client 935 can request and render web pages, such as those written in Hypertext Markup Language ("HTML"), in another markup language, or in a scripting language. The web client 935 can be capable of executing client-side objects, as well as scripts within the browser environment. Additionally, the web client 935 can execute web application programs, which can be embodied in web pages.

A user of the computing device 900 can enter commands and information into the computing device 900 through input devices such as a keyboard 962 and pointing device 961, commonly referred to as a mouse, trackball, or touch pad. Other input devices (not shown) can include a microphone, joystick, game pad, satellite dish, scanner, electronic white board, or the like. These and other input devices are often connected to the processing unit 920 through a user input interface 960 coupled to the system bus 921, but can be connected by other interface and bus structures, such as a parallel port, game port, or a universal serial bus (USB). A monitor 991 or other type of display device can also be connected to the system bus 921 via an interface, such as a video interface 990. In addition to the monitor, the computing device 900 can also include other peripheral output devices such as speakers 997 and a printer 996. These can be connected through an output peripheral interface 995.

The computing device 900 can operate in a networked environment, being in communication with one or more remote computers 980 over a network. The remote computer 980 can be a personal computer, a server, a router, a network PC, a peer device, or other common network node, and can include many or all of the elements described above relative to the computing device 900, including a memory storage device 981.

When used in a LAN networking environment, the computing device 900 can be connected to the LAN 971 through a network interface or adapter 970. When used in a WAN networking environment, the computing device 900 can include a modem 972 or other means for establishing communications over the WAN 973, such as the internet. The modem 972, which can be internal or external, can be connected to the system bus 921 via the user input interface 960 or other appropriate mechanism. In a networked environment, program modules depicted relative to the computing device 900 can be stored in the remote memory storage device. For example, and not limitation, FIG. 9 illustrates remote application programs 985 as residing on memory storage device 981. It will be appreciated that the network connections shown are exemplary and other means of establishing a communications link between the computers can be used.

As discussed above in detail, various exemplary embodiments of the present invention can provide an effective means of identifying, verifying, or providing forensic information about a call audio source, independent of metadata. While detection systems and methods have been disclosed in exemplary forms, many modifications, additions, and deletions may be made without departing from the spirit and scope of the system, method, and their equivalents, as set forth in the following claims.

What is claimed is:

1. A method comprising:
    receiving, for a first call between a plurality of parties at a corresponding plurality of devices, data, received at a first device of the plurality of devices during the first call, representing audio from one or more other devices of the plurality of devices;
    determining, by a computing device, based on the data representing the audio received at the first device, at least one of a noise profile, packet loss characteristics, and speaker-independent artifacts associated with the audio received at the first device; and
    at least one of identifying and verifying uniquely, based on the at least one of the noise profile, packet loss characteristics, and speaker-independent artifacts associated with the audio received at the first device, at least a portion of a path of transmission of the first call between the plurality of devices, wherein the at least one of identifying and verifying uniquely is not dependent on metadata associated with the first call.

2. The method of claim 1, the plurality of parties including a calling party and a called party, the path of transmission of the first call between the plurality of devices comprising a path from a device of the calling party to a device of the called party.

3. The method of claim 1, the plurality of parties including a calling party and a called party, the path of transmission of the first call between the plurality of devices comprising a path from a device of the called party to a device of the calling party.

4. The method of claim 1, wherein the at least one of identifying and verifying uniquely the at least a portion of a path of transmission of the first call comprises identifying a unique telecommunications device involved in the first call.

5. The method of claim 4 wherein the telecommunications device is one of the corresponding plurality of devices.

6. The method of claim 1, further comprising verifying at least a portion of the metadata associated with the first call based on the at least one of identifying and verifying uniquely.

7. The method of claim 1, wherein the at least one of identifying and verifying uniquely the at least a portion of a path of transmission of the first call comprises identifying a geography associated with a device from the one or more other devices.

8. The method of claim 1, wherein the at least one of identifying and verifying uniquely the at least a portion of a path of transmission of the first call comprises determining that the first call and a second call have in common a same portion of the path of transmission of the first call.

9. The method of claim 1, wherein the at least one of identifying and verifying uniquely the at least a portion of a path of transmission of the first call comprises:
    determining a feature profile of the first call based on the data representing the audio received at the first device; and
    classifying the feature profile of the first call based at least in part on a plurality of feature profiles of previous calls.

10. The method of claim 1, further comprising:
    determining a plurality of provenance fingerprints for a plurality of calls, each provenance fingerprint being based on one or more predetermined characteristics detected in audio from an associated call, and each provenance fingerprint uniquely identifying at least a portion of a path of the associated call; and
    compiling the plurality of provenance fingerprints into an exclusion list.

11. The method of claim 10, the exclusion list being a blacklist.

12. The method of claim 10, the exclusion list being a whitelist.

13. The method of claim 1, further comprising:
    determining a plurality of provenance fingerprints for a plurality of calls, each provenance fingerprint being based on characteristics detected in audio from an associated call, and each provenance fingerprint uniquely identifying an associated call source; and
    compiling the plurality of provenance fingerprints into a fraud database.

14. The method of claim 13, further comprising:
    determining a first provenance fingerprint for the first audio from the first call, wherein the provenance fingerprint is based on one or more characteristics of the audio from the first call and uniquely identifies the at least a portion of the path of the first call;
    matching the first provenance fingerprint to at least one of the plurality of provenance fingerprints in the fraud database; and
    automatically providing a notification based on the matching.

15. The method of claim 1, further comprising determining a provenance fingerprint for the first call, wherein the provenance fingerprint is based on one or more predetermined characteristics detected in the audio from the first call.

16. The method of claim 15, wherein the provenance fingerprint uniquely identifies the at least a portion of the path of transmission.

17. The method of claim 16, wherein the provenance fingerprint identifies a unique telecommunications device involved in the first call.

18. The method of claim 16, wherein the provenance fingerprint uniquely identifies a geography of an origin of the first call.

19. The method of claim 15, wherein determining the provenance fingerprint of the first call occurs absent consideration of metadata associated with the call.

20. The method of claim 19, further comprising calculating a risk score indicating a measure of similarity between the provenance fingerprint and the metadata.

21. The method of claim 15, further comprising adding the provenance fingerprint to a blacklist.

22. The method of claim 21, further comprising notifying a caller when a call recipient is included in the blacklist.

23. The method of claim 15, further comprising adding the provenance fingerprint to a whitelist.

24. The method of claim 23, further comprising notifying a caller when a call recipient is included in the whitelist.

25. A system comprising:
    a processor;
    a memory operatively coupled to the processor;
    a characterization unit for extracting, independent of metadata associated with a first call, one or more characteristics from call audio received at only a single end of the first call, wherein the one or more characteristics include at least one of a noise profile, packet loss characteristics, and speaker-independent artifacts associated with the audio received at only the single end of the first call and storing the extracted characteristics in the memory;
    a training unit for learning application of one or more of labels to a plurality of prior call audios, based at least partially on characteristics detected from audio from prior calls; and a prediction unit for predicting, with the processor, labels for the first call based on the learned application of the one or more labels from the training unit to the call audio of the first call.

26. The system of claim 25, the prediction unit being configured to at least one of identify and verify uniquely at least a portion of a transmission path of the first call, based solely on characteristics extracted from the audio from the first call.

27. The system of claim 26, the prediction unit being configured to at least one of identify and verify a unique telecommunications device involved in the first call, based on characteristics extracted from the audio from the first call.

28. The system of claim 26, the prediction unit being configured to at least one of identify and verify a geography of an origin of the first call, based on the characteristics extracted from the audio from the first call.

29. The system of claim 25, the prediction unit being further configured to determine a first provenance fingerprint for the first call, based on characteristics detected in the audio from the first call, the first provenance fingerprint indicating uniquely at least a portion of the path of the audio from the first call.

30. The system of claim 29, the prediction unit being further configured to identify at least a partial match between the first provenance fingerprint for the first call and a second provenance fingerprint for a second call.

31. The system of claim 30, the prediction unit being further configured to identify that a unique telecommunications device involved in the first call is the same as a unique telecommunications device involved in the second call, based on comparing the first provenance fingerprint to the second provenance fingerprint.

32. The system of claim 30, the prediction unit being further configured to identify a common geography between an origin of the first call and an origin of the second call, based on comparing the first provenance fingerprint to the second provenance fingerprint.

33. The system of claim 29, the characterization unit being further configured to identify the noise profile in the audio from the first call, wherein the determination of the first provenance fingerprint is based at least partially on the identification of the noise profile.

34. The system of claim 29, the characterization unit being further configured to measure quality of the audio from the first call, wherein the determination of the first provenance fingerprint is based at least partially on the quality of the audio from the first call.

35. The system of claim 25, the training unit comprising a multi-label classifier.

36. The system of claim 35, the multi-label classifier being configured to identify which of a predetermined plurality of codecs were used to encode the first call.

37. The system of claim 25, the training unit being further configured to detect one or more unique networks traversed by the first call.

38. The system of claim 25, wherein the characterization unit, the training unit, and the prediction unit are co-located at the single end of the first call.

39. A method comprising:
detecting, independent of voice analysis, one or more characteristics associated with a first call solely from data representing audio received at only a single end of the first call, wherein the one or more characteristics include at least one of a noise profile, packet loss characteristics, and speaker-independent artifacts associated with the audio received at only the single end of the first call;
determining, by a processor, a first provenance fingerprint for the first call based on the detected call characteristics; and
identifying and verifying uniquely one or more devices or networks spanning at least a portion of a transmission path of the first call.

40. The method of claim 39, further comprising identifying an error in at least a portion of metadata associated with the first call, based on the characteristics detected in the audio from the first call.

41. The method of claim 40, further comprising calculating a risk score based on a comparison of the provenance fingerprint to the metadata.

42. The method of claim 39, further comprising verifying at least a portion of metadata associated with the first call, based on the characteristics detected in the audio from the first call.

43. The method of claim 39, further comprising identifying at least one type of network traversed by the first call, based on the audio from the first call, wherein the determination of the first provenance fingerprint is based at least partially on the identification of the at least one type of network traversed by the first call.

44. The method of claim 39, further comprising identifying at least one codec used to encode the first call, based on the audio from the first call, wherein the determination of the first provenance fingerprint is based at least partially on the identification of the at least one codec.

45. The method of claim 39, further comprising detecting a packet-loss concealment algorithm used during transmission of the first call, based on the audio from the first call, wherein the determination of the first provenance fingerprint is based at least partially on the detection of the packet-loss concealment algorithm.

46. The method of claim 39, further comprising identifying a geographical origin of the first call, based on the characteristics detected in the audio from the first call.

47. The method of claim 39, further comprising verifying a unique telecommunications device involved in the first call, based on the audio from the first call, wherein the verification comprises:
receiving metadata associated with the first call, wherein the metadata includes a phone number of a calling party;
comparing the metadata to the provenance fingerprint for the first call; and
providing notification whether the provenance fingerprint indicates that the phone number in the metadata is incorrect.

* * * * *